No. 685,869. Patented Nov. 5, 1901.
A. RECTOR.
DEVICE FOR CUTTING OFF AND THREADING PIPES.
(Application filed June 8, 1901.)
(No Model.) 2 Sheets—Sheet 1.

WITNESSES:
F. L. Ourand
J. E. Lambert

INVENTOR
Alcam Rector
BY
John S. Duffie
ATTORNEY

THE NORRIS PETERS CO., PHOTO-LITHO., WASHINGTON, D. C.

No. 685,869. Patented Nov. 5, 1901.
A. RECTOR.
DEVICE FOR CUTTING OFF AND THREADING PIPES.
(Application filed June 8, 1901.)
(No Model.) 2 Sheets—Sheet 2.
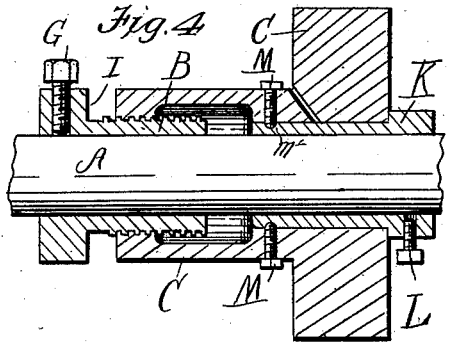
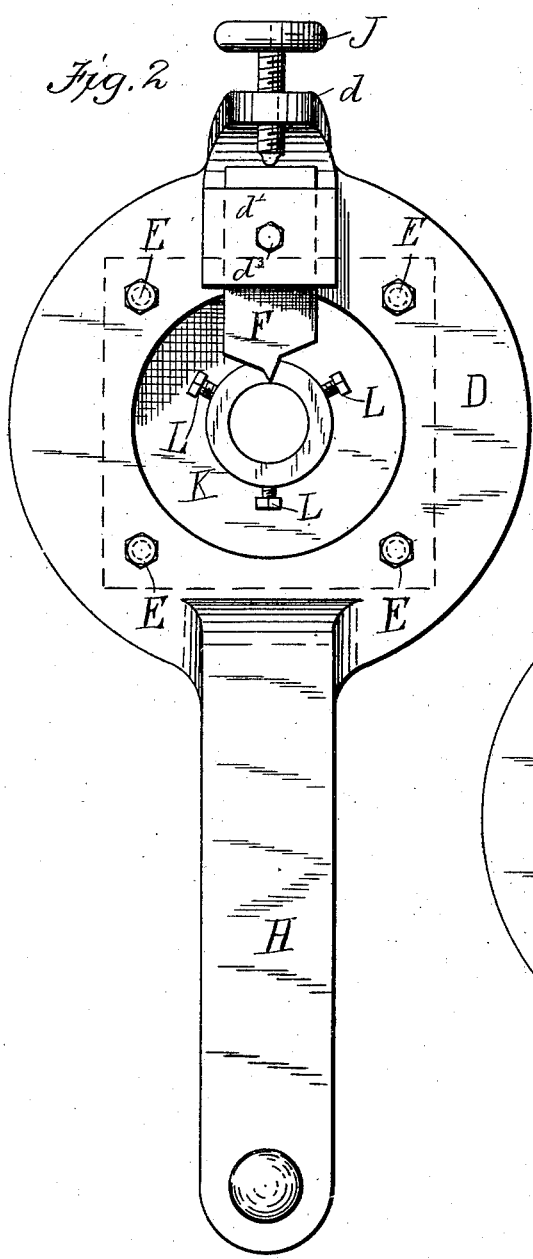
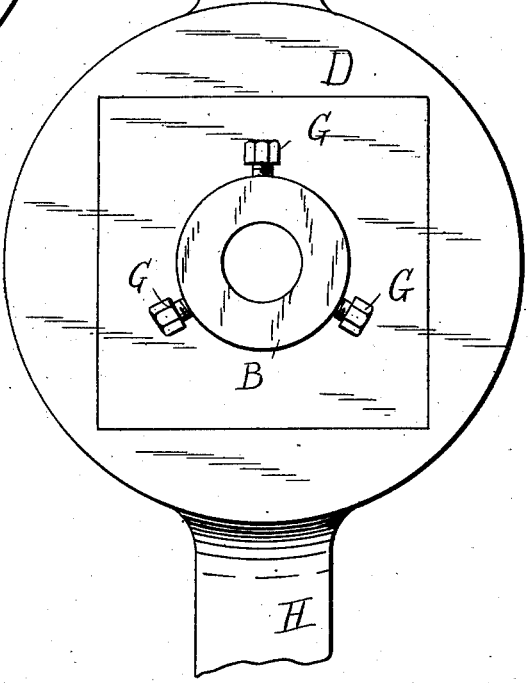
WITNESSES: INVENTOR
Alcorn Rector
BY
ATTORNEY

UNITED STATES PATENT OFFICE.

ALCORN RECTOR, OF HOT SPRINGS, ARKANSAS.

DEVICE FOR CUTTING OFF AND THREADING PIPES.

SPECIFICATION forming part of Letters Patent No. 685,869, dated November 5, 1901.

Application filed June 8, 1901. Serial No. 63,711. (No model.)

*To all whom it may concern:*

Be it known that I, ALCORN RECTOR, a citizen of the United States, residing at Hot Springs, in the county of Garland and State of Arkansas, have invented certain new and useful Improvements in Devices for Cutting Off and Threading Pipes, of which the following is a specification.

My invention is a device for threading and cutting off pipes. I can thread and cut off any pipe varying in size from one-fourth to five inches in diameter that a lathe can.

My device is a hand-lathe that revolves the tool around the pipe instead of the pipe revolving in the lathe.

My invention may be called "stocks and dies." It threads either way, to the right or to the left.

Figure 1:
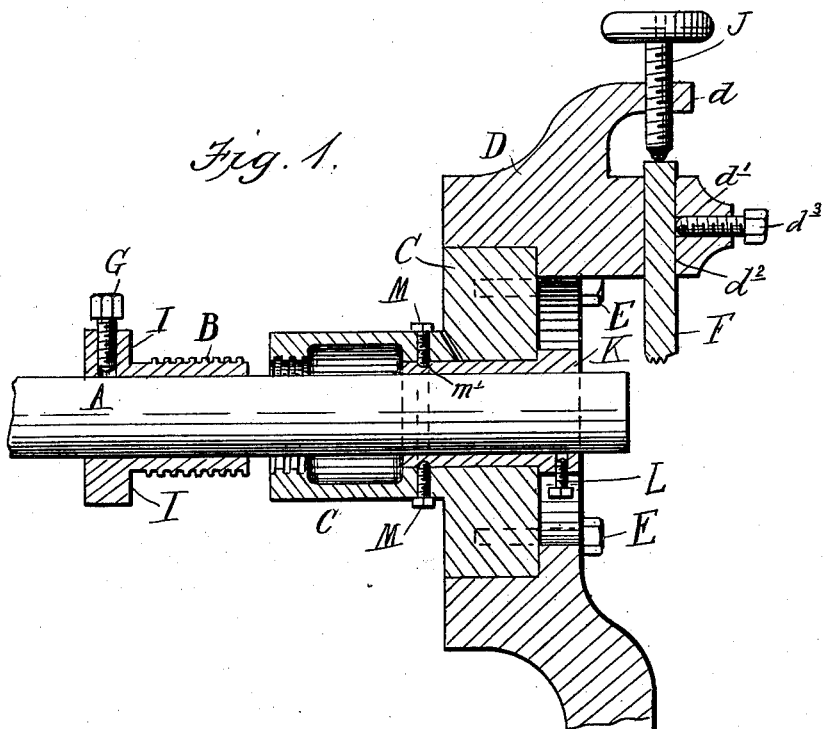
Figure 5:
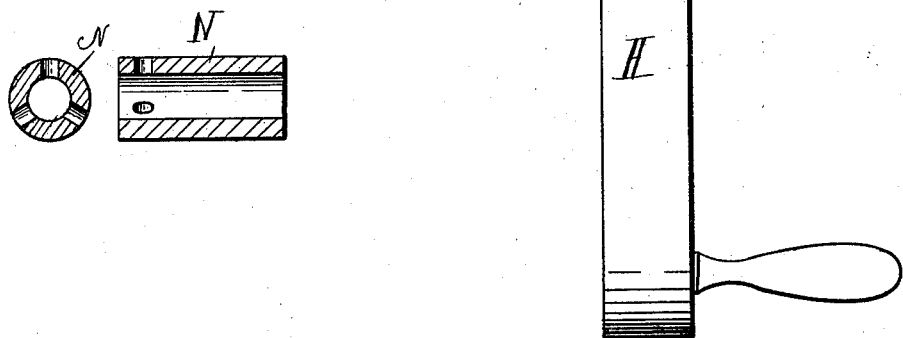

Figure 1 is a vertical sectional view of my invention, except the handle. Fig. 2 is a front end view of my invention. Fig. 3 is a rear end view of my invention. Fig. 4 is a sectional view of the rear part of the device. Fig. 5 is a longitudinal and cross-sectional view of a sleeve used in connection with my invention.

My invention is described as follows:

A is a pipe in position.

B is a threaded sleeve having a shoulder I and is adapted to be rigidly secured to the pipe A by means of screws G. (See Figs. 1 and 3.)

C is a threaded nut in which the threaded portion of B works. This nut C is rigidly secured to the head D by means of screws E, so that when the head is turned by means of crank-handle H the nut C revolves on the pipe. This operation of turning the crank turns the stock or nut and head to the right until the left-hand end of said nut abuts shoulder I.

K is a sleeve or axle for nut C and head D, the screws M simply preventing sleeve K from coming out of nut C as the points of said screws run in the groove M' in and around the sleeve. The sleeve K may be rigidly secured to pipe A by screws L, (see Figs. 1 and 2,) so that when the head D is turned it revolves around sleeve K, allowing D to only have a rotary motion. This is done only when you cut off a pipe. The pipe never turns.

D is the head, provided with an upper threaded projection $d$, in which operates a driving thumb-screw J. Just immediately under the projection $d$ is another projection $d'$, having through it a vertical perforation $d^2$, immediately under and concentric with the threaded opening in which the thumb-screw J operates. In this vertical opening $d^2$ works the cutting-tool F and is secured in place by a screw $d^3$. This cutting-tool F may be taken out and any other appropriate tool supplied in its place, as in practical operation I cut different size pipes and different size threads, and when I wish to cut a pipe off I use a suitable tool for that purpose.

N is a sleeve. (Shown in longitudinal sectional and cross view in Fig. 5.)

My invention is operated as follows: Fig. 1 is a sectional view of the device with dies in readiness for operation on the pipe. I first place the pipe A in a vise. Then I slip sleeve B on the pipe. Then I put K and C in D and fasten securely by screws E. Then I slip the whole, C, K, and D, on pipe A. The threads on sleeve B and in the nut C are the same as the threads which I wish to cut on the pipe. I then screw the sleeve B into nut C until the threads are securely caught. Then I slip the whole until the cutting-tool F comes against the end of the pipe. Then I fasten the sleeve B securely to the pipe by means of screws G. Now I am ready to thread the pipe. To do so, I simply turn the crank-handle H to the right until I have cut on the pipe the number of threads I desire. If the threads thus cut are not sufficiently deep, turn the handle to the left. This operation simply unscrews it until finally the tool F comes again to the starting-point. Then set the cutting-tool deeper by means of a thumb-screw J. Repeat this operation until your threads are deep enough. To cut the end of a pipe off, I do away with the sleeve B, for in this I wish a circular movement only. Fasten K to pipe A by means of screws L. K is a sleeve or axle for nut C and head D, the screws M simply preventing sleeve K from coming out of nut C. To cut the end of a pipe off, I slip it (the head D) along the pipe until the cutter F comes just over where I wish to sever the pipe. I then fasten sleeve K securely by screws L. I then take hold of the crank-handle H and rotate the device and feed the cutting-tool gradually down onto the pipe by means of thumb-screw J until the pipe is severed.

Pipes one-fourth, one-half, and one inch in diameter have the same size threads used on them. The sleeve B is made to fit the one-inch pipe. If I wish to cut the one-half-inch pipe or the one-fourth-inch pipe, the sleeve B is too large for the pipes. I remedy this by an extra internal sleeve N of proper size that fills the space between the pipe and the inner surface of the sleeve B. I have sleeves of various sizes for the purpose just above described, that do away with the necessity of having a different-sized sleeve B and nut C for every size of pipe. The use of these extra sleeves makes the device cheaper than it would be if I had to use an extra sleeve B and nut C for every different size pipe.

When the threads on the pipes change in size, then I have to have an extra sleeve B and nut C, as the threads on parts B and C must be the same as the threads I wish to cut on the pipe. The threads on the parts B and C are made square, as this shape of thread lasts longer than the threads that come to a sharp edge.

Having described my invention, what I claim as new, and desire to secure by Letters Patent, is—

1. A head D, provided with a forward threaded extension $d$; a thumb-screw J, working in the threaded portion of said extension; a lower extension $d'$, immediately under the extension just mentioned, provided with a vertical opening $d^2$, and adapted to carry a cutting-tool F; said cutting-tool adapted to be held in place by a thumb-screw $d^3$; said head provided with a crank-handle H; internally-threaded nut C, secured to said head by means of screws E; a sleeve K, working around the pipe A, and inside of forward end of nut C; said sleeve provided with a circular groove M'; screws M, passing through nut C, and into groove M'; a threaded sleeve B, having a circular shoulder I, and adapted to work in nut C, and adapted to be held securely to a pipe A, by screws G, (see Figs. 1 and 3,) substantially as shown and described and for the purposes set forth.

2. A device for threading and severing pipes, consisting of a head, having a handle; a tool-holding projection extending forward from the front face of said head; a cutting-tool working in said projection; a screw working through said projection, and adapted to hold said tool in place; a threaded projection situated above said last-mentioned projection; a screw through said last-mentioned projection, and adapted to force said cutting-tool downwardly; a nut internally threaded near its rear end, secured to said head; a sleeve working inside of said nut at its front end, and having near its rear end a circular groove; screws screwing through said nut, and into said groove; a threaded sleeve having a circular rear shoulder, and adapted to turn in said nut; a sleeve fitting inside of last-mentioned sleeve, and screws adapted to hold said sleeves securely to a pipe, substantially as shown and described and for the purposes set forth.

In testimony whereof I affix my signature in presence of two witnesses.

ALCORN RECTOR.

Witnesses:
J. H. CUNNINGHAM,
W. M. DRAUGHAN.